United States Patent [19]
McCall

[11] 3,723,696
[45] Mar. 27, 1973

[54] HINGED WELDING SHOE
[75] Inventor: Donald F. McCall, Dorchester, Ontario, Canada
[73] Assignee: General Motors Corporation
[22] Filed: Feb. 14, 1972
[21] Appl. No.: 226,027

[52] U.S. Cl. ..................219/73, 219/126, 219/137
[51] Int. Cl. ..............................................B23k 9/18
[58] Field of Search................219/73, 126, 137, 160

[56]     References Cited

UNITED STATES PATENTS 1,937,605   12/1933   Taylor.............................219/137 X
3,211,887   10/1965   Cotterman.........................219/127
3,433,926   3/1969    Dick.............................219/73 X Primary Examiner—J. V. Truhe
Assistant Examiner—L. A. Schutzman
Attorney—Jean L. Carpenter et al.

[57]             ABSTRACT

A welding shoe used in building a flange on a circular workpiece has a weld forming cavity shaped to the desired cross-section of the flange. A bottom closure member hinged to the shoe body retains the initial weld puddle until congealed and then pivots out of the way to permit relative movement of the shoe and the workpiece.

3 Claims, 5 Drawing Figures

PATENTED MAR 27 1973

3,723,696

HINGED WELDING SHOE

This invention relates to a welding shoe having a hinged closure member suitable for welding on substantially vertical portions of workpieces.

In the process of electro-slag welding, it is known to utilize a welding shoe having a cavity open at the top and bottom and shaped in cross-section according to the desired configuration of the finished weld. The welding normally takes place on a substantially vertical portion of the workpiece and once the weld is initiated, the shoe or the workpiece is moved vertically to produce a continuous deposit of weld material having the shape determined by the weld shoe. Thus, in order for the relative movement to take place, the bottom of the weld forming cavity of the shoe must be open so that the finished weldment may pass therethrough. To initiate the weld, it is a conventional practice to manually build up by arc welding a starting and finishing tab having a configuration according to the shape of the desired weld. This tab then is used to plug the lower opening of the shoe cavity during the initiation of the slag welding process for retaining the molten material. That method, however, is very slow and costly and results are not always consistent because of cold starts and lack of fusion.

It is therefore an object of the invention to provide a welding shoe for welding a workpiece which requires no manual initial weld build up.

It is a further object of the invention to provide a welding shoe with a hinged lower closure member for facilitating initial welding of flanges, fillet or butt welding, particularly on the sides of pipes or other circular objects.

The invention is carried out by providing a welding shoe having a cavity shaped to form the weld to the desired configuration and a lower closure member hinged thereto for retaining the initial weld puddle and being arranged to pivot out of the way after an initial weld portion is congealed to permit relative motion between the shoe and the workpiece.

The above and other advantages will be made more apparent from the following specification taken in conjunction with the accompanying drawings wherein like reference numerals refer to like parts and wherein.

Although the present invention is applicable to using the electro-slag welding process on butt welding of pipe, buildup of flanges and the like on circular objects such as round bar or pipe, fillet welds on circular objects or similar welds on plane surfaces, the preferred application of the invention illustrated and described herein is the buildup of flanges on a pipe.

Figure 1:
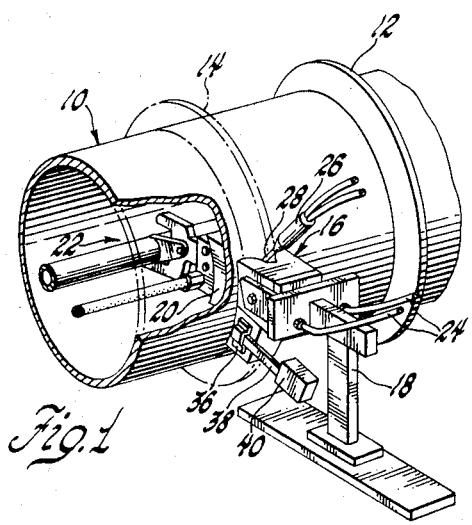
FIG. 1 is a perspective view of a hinged welding shoe according to the invention in engagement with a tubular workpiece.

As shown in FIG. 1, a pipe 10 has an annular flange 12 which has been built up by welding utilizing the subject welding shoe. The locus of a second flange 14 similar to flange 12 which is desired to be formed on the pipe 10 is shown in broken lines. A welding shoe 16 supported by a mounting 18 engages a side wall of the pipe 10 at a place where the wall is substantially vertical. A backup shoe 20 carried by a support assembly 22 is located inside the pipe opposite the welding shoe 16 in a conventional manner. The pipe 10 is rotatably carried by a device not shown, such as a lathe, to permit controlled rotation thereof during the weld process. Conduits 24 are provided for carrying cooling water to and from the shoe 16. Welding apparatus 26 shown in part feeds an arc welding rod 28 to the weld site within the shoe 16.

Figure 2:
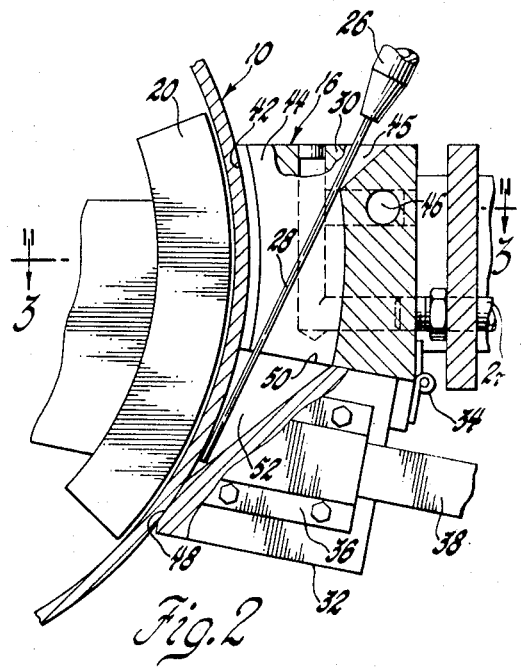
FIG. 2 is a vertical cross-sectional view of the welding shoe and workpiece of FIG. 1.

As best shown in FIG. 2, a shoe 16 comprises a main body portion 30 and a lower closure member 32 pivoted to the main body portion by a hinge 34. A bracket 36 on the side of the closure 32 removably receives one end of a lever 38 which carries on its other end a counterweight 40 (FIG. 1). The counterweight when in place maintains the closure 32 in its closed position as depicted in FIGS. 1 and 2, but when the counterweight is manually removed by sliding the lever from the bracket 36, the weight of the closure 32 causes the closure to swing freely away from the workpiece into the position shown in FIG. 4.

Figure 3:
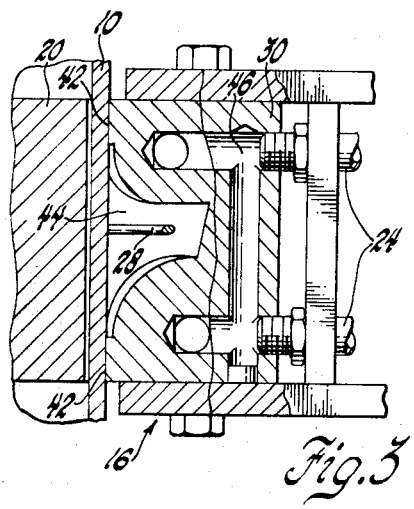
FIG. 3 is a horizontal cross-sectional view of the welding shoe and the workpiece taken along lines 3—3 of FIG. 2; and, FIGS. 4 and 5 are partial cross-sectional views of the welding shoe and workpiece during intermediate and final stages respectively of the weld process.

The main body portion 30 as shown in FIGS. 2 and 3 includes side portions each having an arcuate front face 42 seating against and conforming to the surface of the pipe 10. The inner surface of the side portions define a cavity 44 shaped in cross-section according to the desired cross-section of the finished weld. To facilitate the entrance of the welding rod 28 into the cavity, the cavity is flared rearwardly at the top as indicated by numeral 45. Passages 46 for the circulation of cooling water are formed in the main body and are connected to the conduits 24. The main body portion 30 as well as the closure 32 are preferably formed of a copper alloy to facilitate cooling of the shoe and to prevent adhesion of the weld material thereto.

The closure member 32 has a forward face 48 arcuately formed to conform to the surface of the pipe 10 and a plane upper face 50 which seats against the bottom of the main body portion 30 when in closed position. The upper portion of the closure 32 contains a cavity 52 aligned with the cavity 44 in the main body and is shaped to provide the desired configuration of the initial weld. In the preferred embodiment as shown, the cavity is generally triangular in vertical section to provide a ramp-shaped terminus of the weld.

Figure 4:
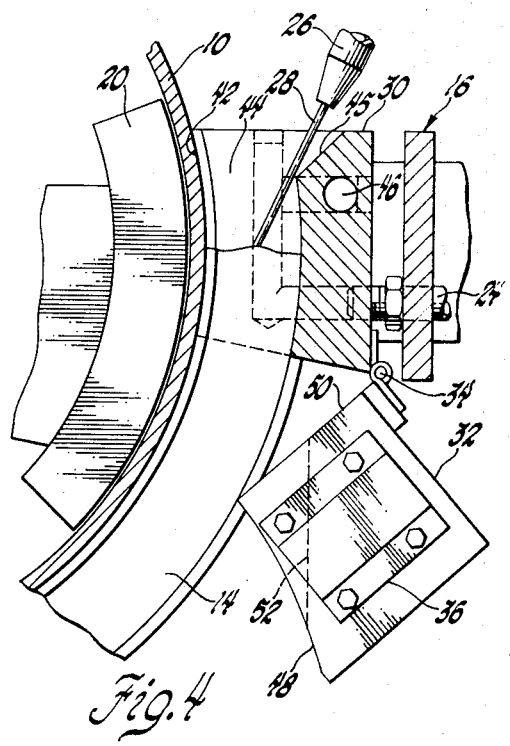
Figure 5:
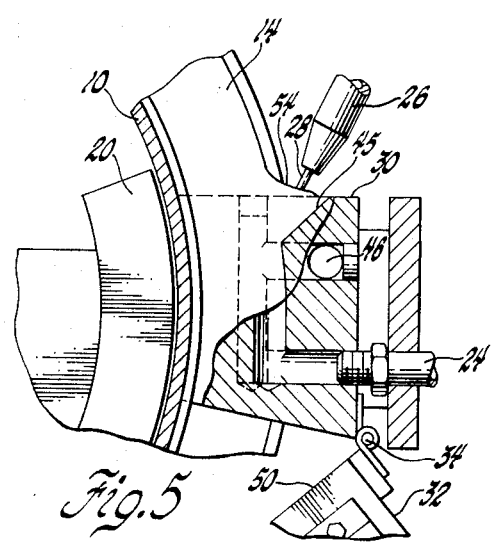

In operation, the weld is initiated by placing the welding shoe 16 against the pipe 10 with the counterweight 40 in place so that the closure 32 is in closed position. Then as shown in FIG. 2, the welding rod 28 is inserted into the cavity 52 and weld current is provided to cause fusion of the continuously fed rod 28 thus creating a molten puddle of weld material in the cavity 52 and in at least a lower portion of the cavity 44 whereupon fusion to the pipe 10 takes place. When the weld material in contact with the closure 32 has solidified sufficiently to support the molten puddle continuously being formed in the cavity 44, the counterweight 40 is manually removed permitting the closure 32 to swing open. Then the pipe 10 is slowly rotated at a rate consistent with the addition of new weld filler material. FIG. 4 illustrates the apparatus when the flange 14 is partially completed and the pipe 10 is rotating. It is seen that by virtue of the open position of the closure 32, the movement of the completed portion of the flange 14 through the shoe is permitted. The completion of the flange buildup is illustrated in FIG. 5 wherein the pipe 10 has made a complete rotation since the weld initiation so that the welding has continued until the flange 14 is complete. The flared portion 45 of the shoe cavity facilitates weld completion but leaves a tab 54 which must be removed by machining.

It will thus be seen that the hinged welding shoe according to the invention eliminates the need of a manually built up starting tab on the workpiece and therefore allows a continuous weld which avoids cold starts and lack of fusion; further the clearance provided with the shoe for finishing the weld permits the pipe to continue rotation thus permitting the high welding heat to fuse the start into a fully homogenous weld at the end.

The embodiment of the invention described herein is for purposes of illustration and the scope of the invention is intended to be limited only by the following claims:

What is claimed is:

1. A welding shoe for welding at least one workpiece in a substantially vertical direction comprising a main body member including a pair of side portions shaped to seat against the workpiece, a forming portion between the side portions having a cross-section conforming to the desired weld configuration, and means for temporarily supporting an initial weld puddle until congealed comprising a closure member hinged beneath the main body member having means for holding the closure member seated against the workpiece during the initiation of welding and for allowing the member to pivot away from the workpiece when the initial weld puddle has congealed.

2. A welding shoe for electro-slag welding at least one circular workpiece in a substantially vertical direction comprising a main body member including a pair of side portions arcuately shaped to seat against the workpiece during sliding relative movement of the shoe and workpiece, a forming portion between the side portions having a cross-section conforming to the desired weld configuration, and means for temporarily supporting an initial weld puddle until congealed comprising a closure member hinged beneath the main body member having means for holding the closure member seated against the workpiece during the initiation of welding and for allowing the member to pivot away from the workpiece when the initial weld puddle has congealed to permit relative movement of the shoe and workpiece, the closure member having a recess aligned with the forming portion, the recess being shaped to impart the desired initial end shape to the weld.

3. A welding shoe for building an annular flange onto a circular workpiece by electro-slag welding in a vertical direction comprising a main body member including a pair of side portions arcuately shaped to seat against the workpiece during sliding relative movement of the shoe and workpiece, a forming portion between the side portions having a cross-section conforming to the desired flange cross-section, and means for temporarily supporting an initial weld puddle until congealed comprising a closure member hinged beneath the main body member having means for holding the closure member seated against the workpiece during the initiation of welding and for allowing the member to pivot away from the workpiece when the initial weld puddle has congealed to permit relative movement of the shoe and workpiece, the closure member having a recess aligned with the forming portion, the recess being shaped to impart the desired initial end shape to the weld to facilitate completion of the flange at the end of the welding process.

* * * * *